May 26, 1936. P. A. BAUMEISTER ET AL 2,041,689
DUST REMOVER FOR DRILLS AND THE LIKE
Filed July 5, 1933 3 Sheets-Sheet 1
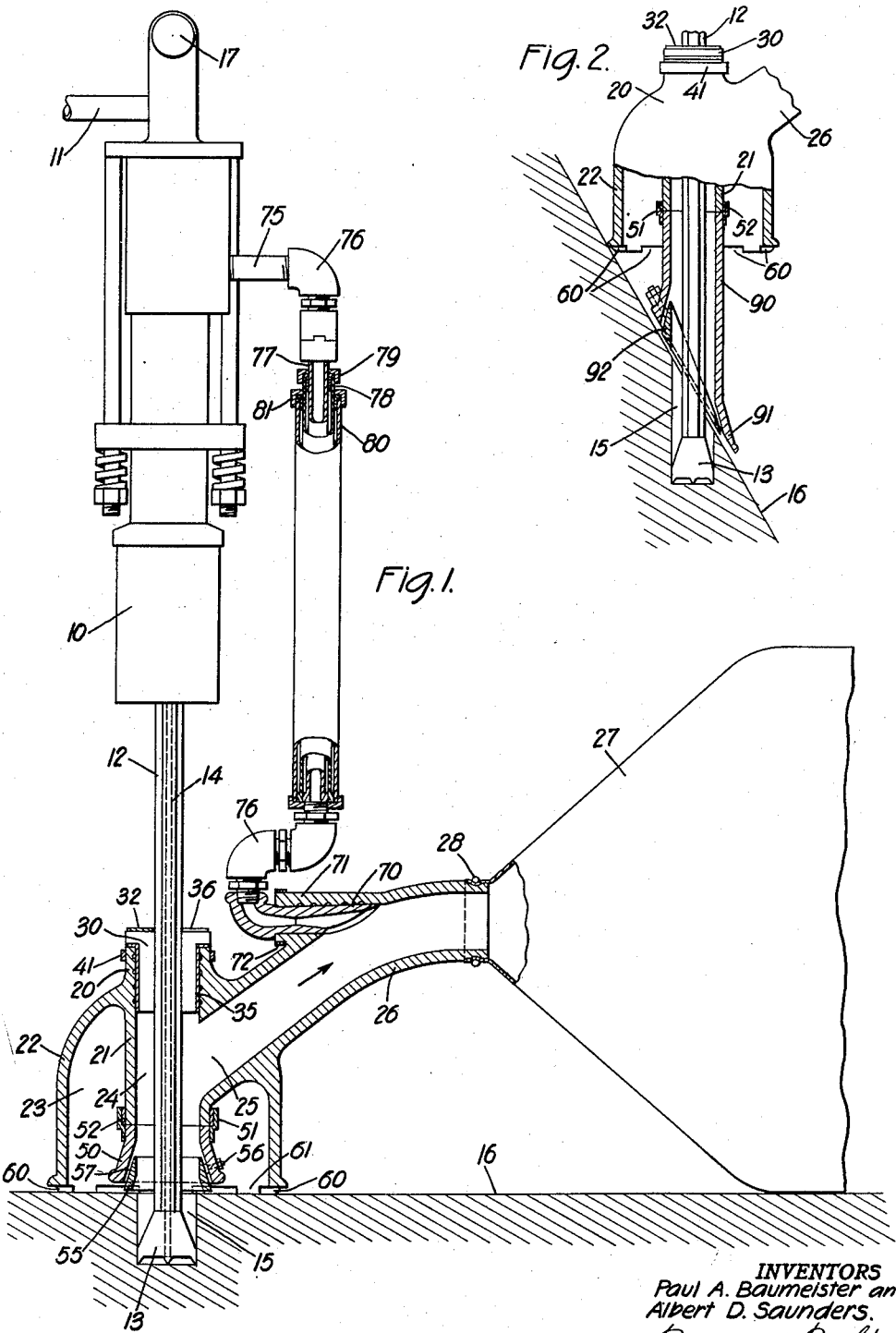
INVENTORS
Paul A. Baumeister and
Albert D. Saunders.
BY Moses + Nolte
ATTORNEYS May 26, 1936.    P. A. BAUMEISTER ET AL    2,041,689
DUST REMOVER FOR DRILLS AND THE LIKE
Filed July 5, 1933    3 Sheets-Sheet 2

INVENTORS
Paul A. Baumeister and
Albert D. Saunders.
BY Moses + Nolte
ATTORNEYS

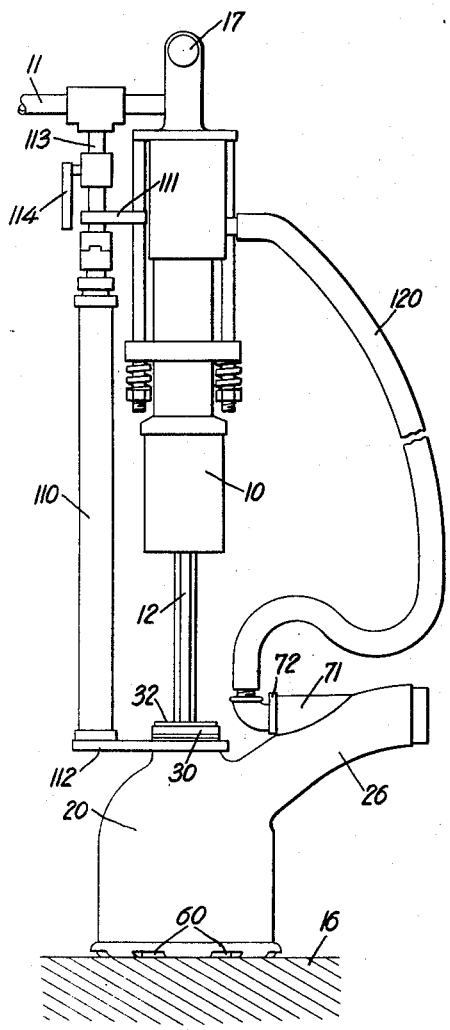
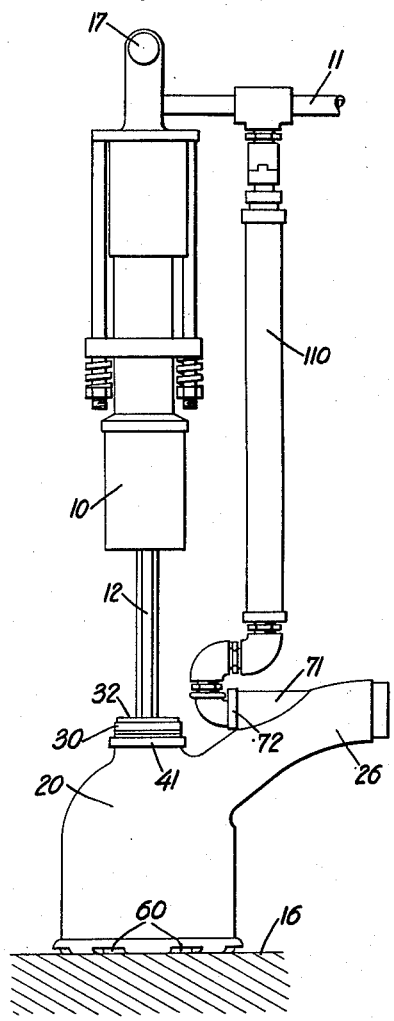

Patented May 26, 1936

2,041,689

UNITED STATES PATENT OFFICE 2,041,689

DUST REMOVER FOR DRILLS AND THE LIKE

Paul A. Baumeister, Flushing, and Albert D. Saunders, Great Neck, N. Y., assignors to The Arthur A. Johnson Corporation, Long Island City, N. Y., a corporation of New York Application July 5, 1933, Serial No. 679,020

8 Claims. (Cl. 255—50)

This invention relates to means for removing and collecting dust and chips produced by the action of power driven tools on hard materials. It is particularly applicable to the removal of rock dust and chips resulting from rock drilling operations, but may be applied to analogous purposes. It is well known that in operations of the character described the drill or other tool produces dust, fine particles and chips which are discharged into the surrounding air, and constitute a serious menace to the health of the workmen. In particular the dust is inhaled by the workmen and causes an affection of the lungs known as silicosis. There are many other obvious disadvantages to the presence of a quantity of dust, for instance in some cases, such as with coal dust, there is serious danger of explosion.

An important object of the present invention is to provide a simple and effective appliance for collecting and disposing of the dust and chips which can be applied to existing drilling equipment without substantial change thereof, and which is self-contained, deriving the power required for its operation from the source of power utilized to actuate the drill. For instance if the device is used in connection with a compressed air or steam drill, the same compressed air or steam which is utilized to drive the drill also performs the dust removing and collecting operation. This may be accomplished either by utilizing the exhaust from the drill, or by by-passing a part of the compressed air or steam before it reaches the drill and utilizing that for the dust removal. In either case no additional source of power is required and therefore additional pipes do not have to be provided nor electric cables or the like. The single compressed air or steam hose which provides the power for driving the drill also provides the power for the dust removal means. This is an important advantage as the provision of additional hose lines or of electric cables is costly and such hose or cable lines are in the way of the workmen and slow up their operations.

Additional objects of the invention include the provision of an improved dust collecting nozzle adapted to permit the ingress of the surrounding atmosphere so as to produce an aspirating effect which draws all the dust into the suction line; to provide means associated with the nozzle for spacing the nozzle mouth from the surface of the body being drilled and which may be adapted to operate on work having varying surface conditions; to provide improved means for urging the dust collecting nozzle toward the face of the work; and generally to improve and simplify the construction of devices of this character, as will be more fully apparent from the description of certain embodiments of the invention chosen to illustrate the principles thereof.

In the accompanying drawings which illustrate a preferred embodiment of the invention;

Figure 1 is a diagrammatic side elevation of a compressed air drill having the improved dust collecting apparatus applied thereto, the dust collecting hood being shown in vertical section;

Figure 2 is a view partly in side elevation and partly in vertical section showing the dust collecting hood applied to an inclined surface, and utilizing a nozzle or mouth piece attachment especially adapted to use upon such a surface.

Figures 7 and 8 are diagrammatic side elevations similar to Figure 1 showing modified arrangements for supplying pressure to the dust remover and for holding the hood against the face of the work.

Figure 3:
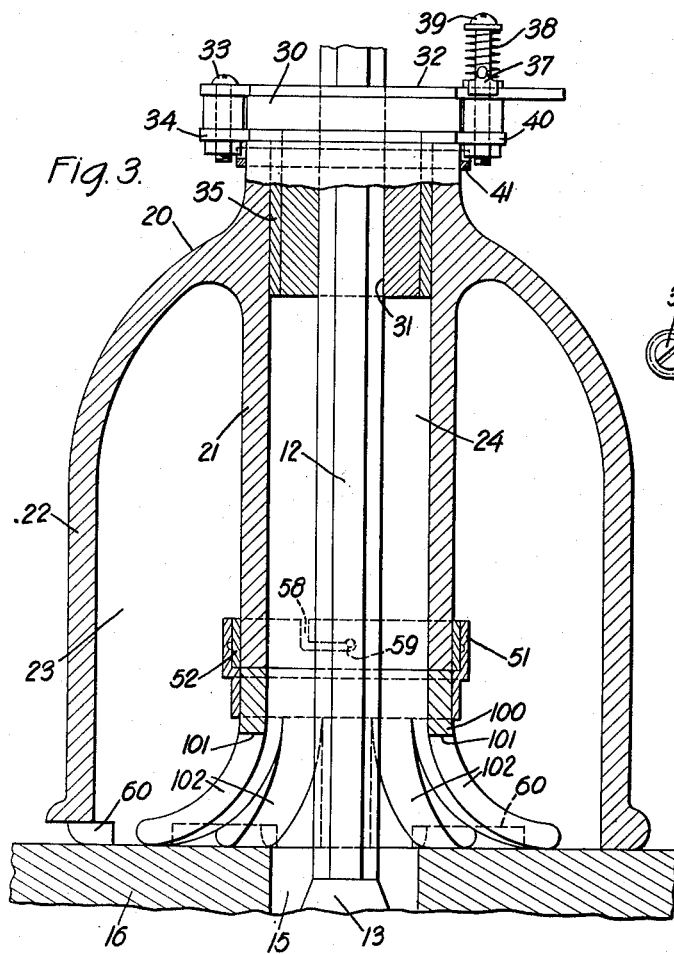
Figure 3 is a vertical sectional view, on a larger scale, of the dust collecting hood showing a different form of nozzle or mouth piece attachment thereon, the hood being shown in position upon the drill rod with the nozzle placed against the work.

Referring to the drawings in detail, 10 represents a conventional rock drill of the compressed air or steam driven type. The compressed air or steam for driving the drill is supplied through a pipe 11 which is connected by a suitable flexible hose (not shown) with a source of pressure. Carried by the drill 10 is the drill rod 12 which has at its lower end the usual drill bit 13 of larger diameter than the drill rod or shank. Usually the drill rod is provided with a central hole 14 through which a limited amount of the compressed air passes down and is discharged to the bottom of the drill hole 15 which is being drilled below the surface 16 of the rock. This compressed air serves to blow the dust and chips out of the drill hole so as to keep the latter free and permit the drill to cut properly. Ordinarily this dust is blown out into the atmosphere and much of it up towards the face of the workman who is leaning over the drill and grasping the drill handles 17.

Figure 5:
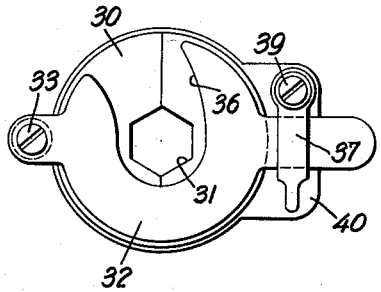
Figure 5 is a top plan view of the bushing and latch mechanism shown in Figure 3.

In the construction illustrated we provide a stable work engaging member in the form of a hood 20 which surrounds the drill rod and extends over the top of the drill hole. In the form illustrated the hood comprises an inner sleeve 21 which is of sufficient diameter to permit the drill bit to pass through the same and an outer sleeve or dome 22 which encloses an outer chamber 23 between it and the sleeve 21. The sleeve 21 encloses a vertical dust passage 24 from which leads a lateral dust passage 25 which communicates with the eduction tube 26. The latter may lead to any suitable receptacle or passage for removal and disposal of the dust, such for instance as the fabric bag 27 which is removably secured on the end of the tube 26 in any suitable manner, as by the spring ring 28. The bag 27 permits the air to escape, but retains the dust in the manner usual in vacuum cleaners. The space around the drill rod at the top of the sleeve 21 is closed by means of a split bushing 30 which has a central opening 31 substantially fitting the drill rod and which is loosely and removably held in the top of the bore of the sleeve 21 by means of a retainer plate 32 which is pivoted by pivot 33 to a lug 34 projecting from the flange of a bushing sleeve 35 secured in the top of the hood. The plate 32 is provided with an open sided slot 36 as shown in Figure 5 so as to clear the drill rod and is adapted to be swung out of position to permit the removal of the bushing when the hood is to be taken off from the drill rod or when a drill rod is to be replaced. The plate 32 is held in bushing retaining position by means of a latch 37 pressed down by a spring 38 carried by a pin 39 which is mounted in a lug 40 projecting from the flange of the bushing sleeve. Obviously any other suitable construction of the removable bushing and means for retaining it in position may be substituted for that shown. The hood comprising the inner sleeve 21 and the dome 22 may be made of any suitable metal, such for instance as aluminum, but we prefer to make this construction out of heavy rubber, as this is light and at the same time substantially indestructible and cannot be broken by rough handling. In the event that rubber is used, the bushing sleeve 35 is firmly clamped therein as by means of a clamping band 41, and reenforces the neck of the hood and provides a means for supporting the removable bushing in place.

The lower end of the sleeve 21 is arranged to terminate close to the surface 16 of the rock or other material being drilled. The nozzle or mouth piece which approaches the rock surface may be the lower end of the sleeve itself, as will be obvious, or a detachable nozzle or mouth piece may be employed, one form of such nozzle being shown in Figure 1, another modified form in Figure 2, and a third form in Figures 3 and 4. The form of nozzle shown in Figure 1 comprises a sleeve section 50 which may be formed of rubber or metal and which is secured to the lower end of the sleeve 21 by means of a slotted ring 51 having a bayonet joint connection with pins mounted in the metal ring 52 secured to the bottom of the sleeve 21 in the manner illustrated particularly in Figure 3. The sleeve section 50 is spaced slightly away from the rock surface and is outwardly flared and in it is mounted a tapered aspirating ring or mouthpiece 55 which is secured to the sleeve section by means of bolts 56, three or more of which are preferably utilized and which support the ring near to, or in contact with, the surface of the rock, and also in such a way as to leave an annular air passage 57 between the outer tapered face of the ring and the inner flared surface of the sleeve section 50. The bottom of the dome 22 is preferably provided with slots 60 which permit the passage of air from the outside into the dome, the spaces between the slots constituting feet 61 adapted to rest on the rock surface and support the hood.

The eduction pipe 26 is entered by a pressure nozzle or jet 70 which preferably comprises a metal nozzle fitting in a lateral branch 71 of the eduction pipe and held in place in any suitable manner, as by a clamping ring 72.

The nozzle jet 70 is preferably of the adibatic diverging type as shown and acts in conjunction with the eduction tube to form an ejector or inductor inducing a vacuum in and through the eduction tube and hood which creates a flow of air at high velocity from the drill hole and through the spaces around the lower end of the hood. This high velocity flow of air from the outside inward and upward through the space 24 and tube 26 carries the dust, cuttings, etc. away from the drill hole and space inside of the hood into the dust bag or separator.

The nozzle jet 70 is supplied with pressure from any suitable source but preferably either directly or indirectly from the source of pressure utilized to operate the drill. In the construction shown in Figure 1 the exhaust from the drill is used as a source of pressure. For this purpose the exhaust which issues from the drill through a pipe 75 is conveyed to the nozzle jet through suitable pipe connections 76. Included in these pipe connections is a series of telescopic pipes shown as comprising an inner pipe 77, an intermediate pipe 78 which has a sliding packed joint 79 with the inner pipe, and an outer pipe 80 which has a sliding packed joint 81 with the intermediate pipe. Because of the sliding arrangement of these pipes they may be collectively referred to as the "trombone". This telescopic arrangement performs two purposes, first it permits the adjustment between the drill and the hood to take place as the drill bores into the rock, and second, it provides a means of applying pressure against the hood to hold the same against the face of the rock. The internal pressure in the telescopic pipes tends to extend the series of pipes or trombone longitudinally and as this extension is resisted by the weight of the drill and the hands of the operator manipulating the drill, the pressure will hold the hood in place against the rock surface. Obviously a light pressure only is needed for this purpose and the reaction is easily taken up by the weight of the drill and the hands of the operator. In fact when used upon a horizontal surface as shown in Figure 1 the weight of the drill alone is amply sufficient.

In the operation of the construction shown in Figure 1 it will be seen that the compressed air entering the drill through the pipe 11 actuates the drill and causes it to bore the hole 15 in the rock. A small amount of the compressed air is also blown through the hole in the drill into the bottom of the drill hole and forces the dust and chips up to the surface. The air exhausted from the drill which is still at some pressure above atmospheric passes through the telescopic pipe and is discharged through the nozzle jet 70 into the upper part of the eduction tube 26 and induces a rapid flow of air through the eduction tube and into the dust bag. This induced flow of air carries away the small amount of air which comes up from the drill hole and it also sucks in the air around the bottom of the dome through the slots 60 and under the bottom of the nozzle 50 and ring 55 and through the space 57 between the nozzle and ring. This flow of air inwardly adjacent to and over the top of the drill hole 15 picks up all of the dust and small chips and carries the same through the eduction tube into the dust bag. With the arrangement shown there is a sort of triple aspirating effect, the drill hole acting as a sort of jet and also the guide ring 55. There is therefore a jet or inductor action in three places, one at the exit of the drill hole, one at the top of the guide ring, and one at the point where the nozzle jet 70 discharges into the eduction tube. The dome 22 helps to support the hood, protects the nozzle and guide ring, and also prevents any of the larger chips which might be blown out of the drill hole and not taken up by the inflowing air currents from being thrown out into the surrounding air, such larger chips being stopped by the dome and either later carried up with the air currents or retained in the space between the nozzle and the lower edge of the dome. The flow of air described and the combined action of the different jet openings mentioned provide for the very effectual sweeping up of all of the dust and small particles which are carried to the dust collector bag. The danger of the escape of fine dust which might be inhaled by the workmen is thus entirely eliminated. This is done without the necessity for an elaborate vacuum system of dust collection which would require a separate system of piping, add greatly to the cost of the apparatus and seriously interfere with the facility of handling the same.

Figure 2 shows a modified form of nozzle construction adapted for use where it is desired to drill a vertical hole in an inclined surface. The construction is the same as that shown in Figure 1, except that the sleeve 50 carrying the ring 55 has been removed and an elongated sleeve section 90 attached in its place. The section 90 has an inclined lower edge 91 adapted to conform more or less to the inclination of the rock surface, and carrying an inclined guide ring 92 which functions in the same manner as the guide ring 55.

Figure 4:
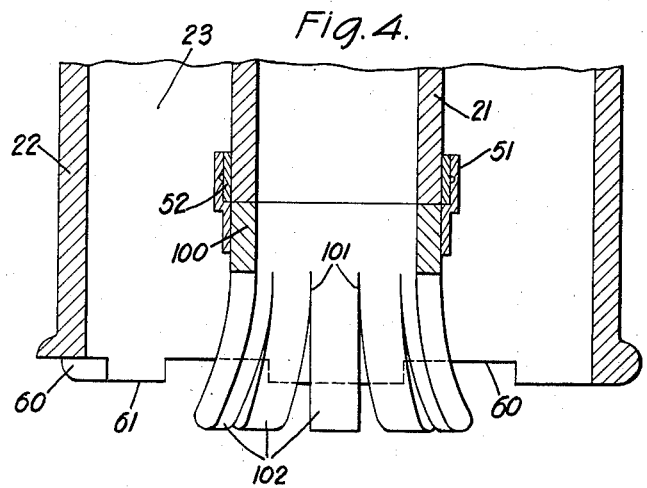
Figure 4 is a similar view of the lower part of the hood and nozzle showing the same removed from the work.
Figure 6:
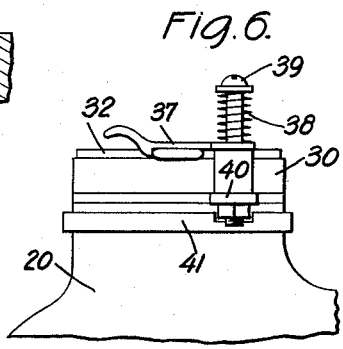
Figure 6 is a side elevation of these parts viewed from a position 90° removed from the position shown in Figure 3.

Figures 3 and 4 show another form of nozzle or mouth piece which we have found very desirable and which is adaptable for use on surfaces of various slopes and contours. In accordance with this construction, the nozzle or mouth piece comprises a rubber sleeve section 100 secured in place by means of a metal ring 51 having bayonet slots 58 therein which engage with pins 59 carried by the ring 52 attached to the sleeve 21. The lower part of the sleeve section 100 is provided with numerous vertical slits 101 so as to form a plurality of flexible tongues 102 which engage the surface of the work, and, owing to their flexibility, will conform to irregularities thereof. The spaces between the tongues permit the air currents to enter and carry up the dust in the manner already described.

In Figure 7 is illustrated a modified arrangement for applying pressure to hold the hood against the work. As here illustrated, a series of telescopic cylinders 110, or "trombone", is mounted between a bracket 111 projecting from the drill body and a bracket 112 mounted on the neck of the hood. Air is led into the telescopic pipes through a branch 113 controlled by a three-way cock 114 directly from the high pressure pipe 11 supplying the air to the drill. The lower end of the telescopic cylinders is dead ended so that the pressure merely tends to extend the telescope and thereby force the hood against the work. Owing to the fact that the air in the pipe 11 is under a higher pressure than the exhaust air, as in the construction previously described, a greater pressure upon the hood is secured. This is particularly desirable where the drilling is being done horizontally or overhead, and more force is needed to hold the hood in place. In the construction shown in Figure 7 the nozzle jet is supplied by the air exhausted from the drill, and this may be conveyed to the eductor tube 26 either by means of a telescopic pipe as shown in Figure 1, or as shown in Figure 7 by means of a flexible hose 120.

Figure 8 shows another possible modified arrangement of the apparatus in which, instead of using the exhaust from the drill to supply the pressure for the jet in the eductor tube, the full air pressure direct from the supply pipe 11 is utilized, this being shown as conveyed to the jet by means of a telescopic pipe arrangement of the form shown in Figure 1. By taking the air for the jet directly from the high pressure line a stronger suction for carrying away the dust is provided, but ordinarily the use of the exhaust pressure as shown in Figures 1 or 7 is found sufficient for this purpose.

The use of the apparatus described not only avoids the dangers and objections due to the scattering of the dust and chips into the surrounding atmosphere, but it actually increases the efficiency of the drilling operation by helping to remove the dust from the drill hole. Dust and cuttings therefore do not accumulate in the drill hole so as to cushion the drill and interefere with its effectiveness in operating upon the bottom of the hole. Furthermore the removal of the chips, cuttings, and dust from the vicinity of the drill hole prevents the débris from falling into the hole being drilled, or into the adjacent holes, and thereby keeps the holes clean for the introduction of the blasting charge, and therefore increases the effectiveness of the blasting operation. Owing to the fact that no additional pressure or suction lines or electric cables are needed in the operation of this apparatus, the work can be cleared for blasting as readily as can be done with the ordinary drilling equipment in which no provision is made for dust removal.

While the apparatus has been described as used in connection with a drill held by hand, it is obvious that it can also be used where the drill is mounted on a carriage for feeding the same. In such instances the telescopic pipes or other arrangement for supporting or applying pressure to the hood may be attached to the carriage or carriage supports instead of directly to the drill body. In some cases, such as in tunnel work, it may be desirable instead of using an individual dust collecting bag as illustrated, to lead the dust from several hoods to a manifold or to a pipe by which the dust may be removed to a distant point by an exhaust fan, jets, or other suction devices. The apparatus can also be used when drilling wet holes, where it may be found that particles are discharged from the water.

The apparatus shown is particularly adapted for use and has been described in connection with a rock drill, but it is obvious that it may be utilized with slight modifications in connection with other types of drills or abrading tools, whether reciprocating or rotary, or in connection with grinders, saws, brushes, sanders, etc.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principles may be utilized.

We claim:

1. In apparatus for removing dust from rock drills or the like, a hood adapted to enclose the outer end of a drill hole, said hood including a sleeve adapted to surround the drill rod and extend into proximity to the surface of the body being drilled, said sleeve terminating in a nozzle having a flaring lower end and a tapered ring supported in said flaring end, but spaced therefrom so as to provide an annular air passage between the outer surface of said ring and the tapered inner surface of said nozzle, said hood being provided with means external to the sleeve for supporting the lower end of said nozzle in proximity to, but slightly spaced from, the surface of the body being drilled, and means for exhausting air from said sleeve.

2. In a pneumatic drill, in combination, a motor, a hollow drill tool, means for blowing air through the drill tool while the motor is operating, a suction nozzle surrounding the drill tool, a mouthpiece disposed within the nozzle in spaced relation thereto and projecting beyond the mouth of the nozzle to engage the face of the work adjacent the drill hole, an ejector, means utilizing exhaust air from the motor to operate the ejector, a suction conduit forming with the nozzle a substantially sealed passage from the intake end of the nozzle to the ejector, and means fixed longitudinally with reference to the nozzle and forming a stable work engaging base for spacing the intake end of the nozzle from the work.

3. In a pneumatic drill, in combination, a motor, a hollow drill tool, means for blowing compressed air through the drill tool while the motor is in operation, a suction nozzle carried by the drill, surrounding the drill tool, and guided for movement axially of the tool, a suction producing device, a suction conduit forming with the nozzle a continuous sealed passage from the nozzle mouth to the suction device, a work engaging abutment device fixed longitudinally with reference to the nozzle and projecting beyond the mouth thereof to space the nozzle mouth from the work, and yielding means interposed between the motor and the abutment device and responsive to a flow of air through said yielding means for urging the abutment device against the work.

4. In a pneumatic drill, in combination, a motor, a hollow drill tool, means for blowing compressed air through the drill tool while the motor is in operation, a suction nozzle surrounding the drill tool, an ejector for drawing air through the nozzle, a suction conduit for forming with the nozzle a substantially sealed passage from the mouth of the nozzle to the suction device, transmission means for conducting exhaust air from the motor to the ejector to operate the latter, a work engaging abutment device fixed longitudinally of the nozzle and projecting beyond the mouth thereof toward the work, and yielding means interposed between the motor and the abutment device for urging the latter against the work, comprising a pneumatically expandible member included in said transmission means and expandible in response to the exhaust air flowing to the ejector.

5. In a pneumatic drill, in combination, a motor, a hollow drill tool, means for blowing compressed air through the drill tool while the motor is in operation, a suction nozzle surrounding the drill tool, a suction device, a suction conduit forming a continuous, substantially sealed connection between the nozzle and the suction device, a work engaging abutment device fixed longitudinally of the nozzle and projecting beyond the mouth thereof to space the nozzle mouth from the work, pneumatically expandible spacing means interposed between the motor and the abutment device for urging the latter toward the work, and means for causing exhaust air flowing from the motor through the pneumatic spacing means to render said pneumatic spacing means effective.

6. In a pneumatic drill, in combination, a motor, a hollow drill tool, means for blowing air through the drill tool while the motor is in operation, a suction nozzle surrounding the drill tool, a suction device drawing air through the nozzle, work engaging abutment means mechanically spacing the nozzle from the work, and a mouthpiece disposed within the nozzle in spaced relation thereto and projecting beyond the mouth of the nozzle to engage the work and cover the drill hole, to confine the cuttings from the work and direct them into the nozzle.

7. In a pneumatic drill, in combination, a motor, a hollow drill tool, means for blowing air through the drill tool while the motor is in operation, a suction nozzle surrounding the drill tool, a suction device drawing atmospheric air into the nozzle, and a work engaging mouthpiece secured in the nozzle in spaced relation thereto and projecting beyond the end thereof to engage the face of the work adjacent the drill hole and confine the cuttings from the work and direct them into the nozzle.

8. In a rock drill, in combination, a drill rod, a nozzle surrounding the drill rod and adapted to extend into proximity to the surface of the body being drilled, means for engaging the work to space the intake end of the nozzle from the work, and a mouthpiece supported in the end of said nozzle and extending beyond the intake end thereof but spaced from the nozzle so as to provide an annular air passage between the outer surface of said mouthpiece and the inner surface of said nozzle.

PAUL A. BAUMEISTER.
ALBERT D. SAUNDERS.